US010059348B2

(12) United States Patent
Malahy et al.

(10) Patent No.: US 10,059,348 B2
(45) Date of Patent: *Aug. 28, 2018

(54) NOTIFICATION MANAGEMENT

(71) Applicant: Google LLC, Mountain View, CA (US)

(72) Inventors: Evan Malahy, Sunnyvale, CA (US); Donald Geoffrey Schuller, San Jose, CA (US); Henry Owen Newton-Dunn, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,657

(22) Filed: Apr. 3, 2017

(65) Prior Publication Data
US 2017/0203771 A1    Jul. 20, 2017

Related U.S. Application Data

(63) Continuation of application No. 14/310,528, filed on Jun. 20, 2014, now Pat. No. 9,615,350.

(51) Int. Cl.
*H04W 4/12* (2009.01)
*B60W 50/14* (2012.01)
*G07C 5/08* (2006.01)
*B60W 40/08* (2012.01)
(Continued)

(52) U.S. Cl.
CPC ............... *B60W 50/14* (2013.01); *B60C 9/00* (2013.01); *B60W 40/08* (2013.01); *B60W 50/08* (2013.01); *G07C 5/0816* (2013.01); *B60W 2050/143* (2013.01); *B60W 2540/00* (2013.01); *H04W 4/12* (2013.01)

(58) Field of Classification Search
CPC ...... B60W 50/00; B60W 50/08; B60W 50/14; B60W 50/16; B60W 2050/143; B60W 2540/00; G07C 5/0816; H04W 68/00; H04W 4/12; H04W 4/16; H04M 1/6075; H04M 1/72569
USPC ....... 340/5.2, 5.21, 438, 439, 468, 988, 995, 340/705, 711; 455/414.1
See application file for complete search history.

(56) References Cited

U.S. PATENT DOCUMENTS 9,615,350 B2 * 4/2017 Malahy ................ H04W 68/00
2011/0244830 A1 10/2011 Chesnutt et al.
(Continued)

OTHER PUBLICATIONS

Author: Daren C. Brabham Title: Crowdsourcing (abstract on the titled book) Date: 2013 Publisher: IEE.org for abstract on the book titled Crowdsourcing, MIT Press.*
(Continued)

*Primary Examiner* — Steven Lim
*Assistant Examiner* — Mancil Littlejohn, Jr.
(74) *Attorney, Agent, or Firm* — Shumaker & Sieffert, P.A.

(57) ABSTRACT

Systems, device and techniques are disclosed for determining whether a mobile device is in vehicle mode. A notification may be received while the mobile device is in vehicle mode and the notification may be determined to be important or unimportant. If the notification is determined to be important, then the notification may be provided to the user via an output mode (e.g., display or speaker). If the notification is determined to be unimportant, then the notification may not be provided to the user via the display until the mobile device is no longer in vehicle mode.

29 Claims, 4 Drawing Sheets

(51) Int. Cl.
   *B60W 50/08*   (2012.01)
   *B60C 9/00*    (2006.01)

(56) References Cited

U.S. PATENT DOCUMENTS

| | | | | |
|---|---|---|---|---|
| 2012/0250517 A1* | 10/2012 | Saarimaki | ............ | H04W 4/001 |
| | | | | 370/241 |
| 2013/0035117 A1* | 2/2013 | Litkouhi | ................ | H04L 67/12 |
| | | | | 455/456.4 |
| 2014/0370870 A1* | 12/2014 | Mankowski | .......... | H04W 4/006 |
| | | | | 455/418 |

OTHER PUBLICATIONS

"iOS Understanding notifications". http://support.apple.com/kb/ht3576. Jan. 17. 2014.
Daren C. Brabham, Crowdsourcing, 2013 MIT press.
Local & Push Notif.Prog.Gd., iOS Dev.Lib., developer.apple.com/library/ios/documenttation/NetworkingInternet/Conceptual/RemoteNotificationsPG/Introduction.html , Feb. 11, 2014.

* cited by examiner

NOTIFICATION MANAGEMENT

BACKGROUND

Many mobile devices and automotive multimedia systems provide notification to a driver while operating a vehicle, which can distract the driver. In general, distracted driving is any activity that could divert a person's attention away from the primary task of driving. All distractions endanger driver, passenger, and bystander safety. Notifications from a mobile device and/or use of a mobile device requires visual, manual, and cognitive attention from the driver, and is generally considered an alarming distraction. For example, if a driver is driving a vehicle, providing unimportant notifications via the mobile device may be unnecessarily distracting for the driver.

BRIEF SUMMARY

According to implementations of the disclosed subject matter, a determination may be made that a mobile device is in a vehicle mode. The mobile device may receive a first device notification and a second device notification. A determination may be made that the first device notification is an important notification and that the second device notification is not an important notification. The first device notification may be provided via an output mode (e.g., a vehicle display such as a heads up display, dashboard display, navigation display, a vehicle speaker etc., or the mobile device display or speaker). The second device notification may not be provided via a display at least until the mobile device is no longer in vehicle mode.

According to implementations of the disclosed subject matter, a means determine that a mobile device is in a vehicle mode are provided, where a first device notification and a second device notification is received at the mobile device. A determination may be made that the first device notification is an important notification and that the second device notification is not an important notification. Means may be provided for the first device notification to be provided via an output mode (e.g., a vehicle display such as a heads up display, dashboard display, navigation display, vehicle speaker etc., or the mobile device display or speaker). The second device notification may not be provided via a display at least until the mobile device is no longer in vehicle mode.

Systems and techniques according to the present disclosure allow presenting important notifications to a user while preventing unimportant notifications from being presented to the user. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein enable providing only important notifications to a user while a mobile device (e.g., mobile phone) is in a vehicle mode (e.g., while the user is driving a car). A determination may be made as to whether a mobile device is in a vehicle mode where a user may benefit from receiving only important notifications and not receiving unimportant notifications. A notification may be designated as important or unimportant according to the techniques disclosed herein. A notification that is designated as important may be provided to a user via an output mode (vehicle display or speaker or via a mobile device display or speaker). A notification that is designated as unimportant may not be provided to the user when the notification is received. Rather, the notification may either never be provided to the user or maybe provided to the user when the mobile device is no longer in vehicle mode. As an example, a user may connect her mobile phone to her car via a Bluetooth connection and the mobile phone may enter a vehicle mode based on the connection. While the mobile phone is in the vehicle mode, a sports update notification may be received by the mobile phone from a sports score application that is installed on the phone. The sports update notification may have an importance Boolean value of 0 indicating that the sports update notification is not important. Accordingly, the sports update notification may not be provided to the user via either her dashboard, heads up display, navigation screen, vehicle speaker or the mobile device itself. The user may also receive an SMS message from a person who is listed as an important contact. Based on a determination that the SMS message is important, a notification may be provided to the user via the navigation display of the car.

Figure 1:
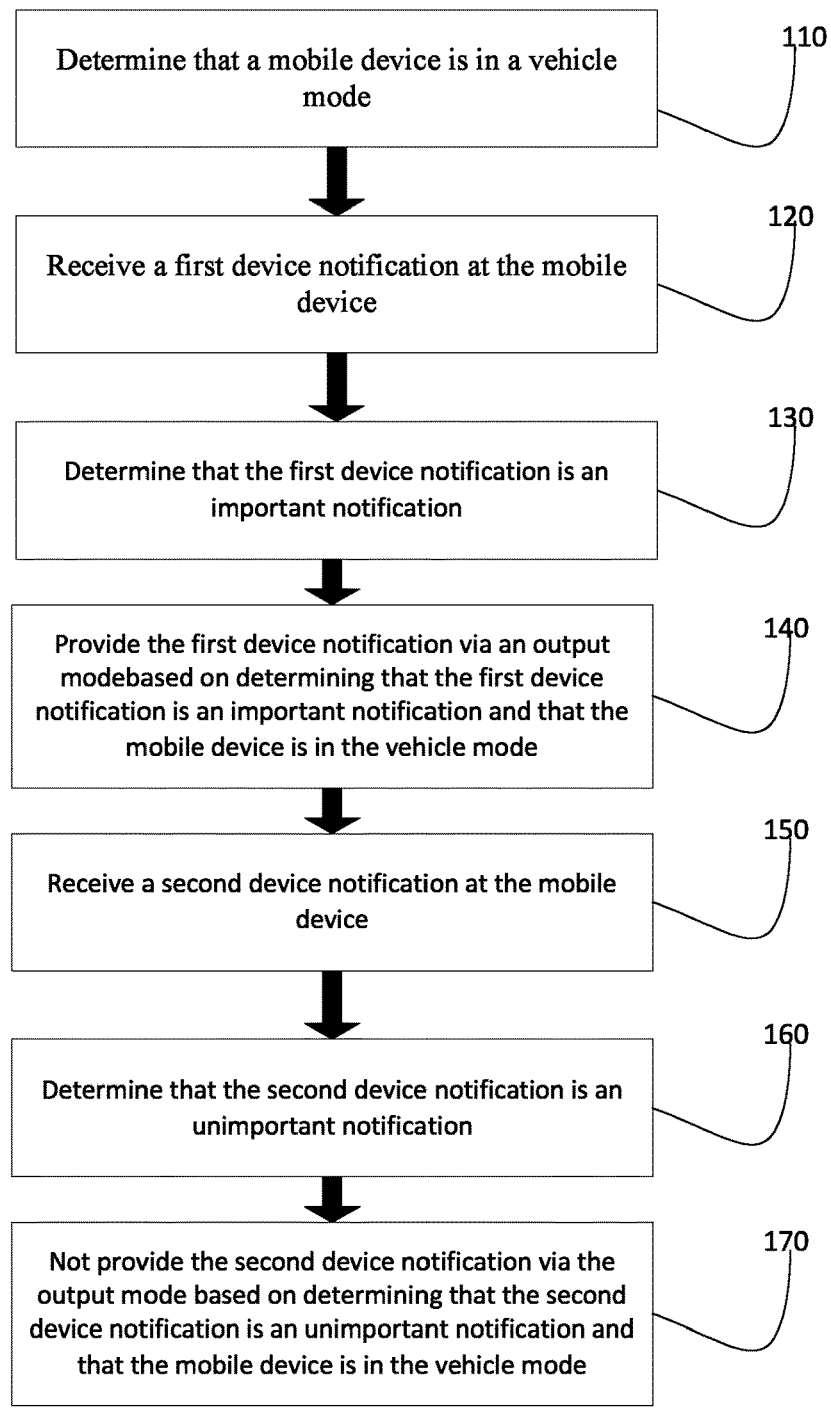
FIG. 1 shows an example process for providing important notifications, according to an implementation of the disclosed subject matter.

According to an implementation of the disclosed subject matter, as shown in FIG. 1 a determination may be made as to whether a mobile device is in a vehicle mode or not. The determination may be made based on a speed associated with a mobile device, a connection between the mobile device and a vehicle, a current characteristic of the vehicle associated with a mobile device, or the like.

Whether a mobile device is in a vehicle mode may be determined based on a speed associated with a mobile device. The speed associated with a mobile device may be determined based on a mobile device sensor such as an accelerometer, a GPS sensor, a or the like As an example, a first position may be calculated using data received from the GPS sensor at a first time and a second position may be calculated using data received from the GPS sensor at a second time. Based on the two positions and a time calculation, the speed of the mobile device may be calculated. If the speed is above a threshold amount, then the mobile device may be operated in a vehicle mode or treated as operating in a vehicle mode. If the speed is below the threshold amount, then the mobile device may not be operated in or treated as operating in a vehicle mode.

Whether a mobile device is in a vehicle mode may be determined based on a connection between the mobile device and a vehicle. The connection may be between the mobile device and any applicable component associated with the vehicle such as a wireless connection via an embedded Bluetooth transceiver, a Bluetooth accessory, an infrared connection, a wired connection via an auxiliary cable connection, a microphone jack connection, or the like. If a connection between the mobile phone and the vehicle is determined, then the mobile device may be operated in a vehicle mode. It will be understood that the connection may simply be a ping to detect whether the mobile device is located within or near the vehicle such that a constant back and forth communication between the mobile device and vehicle is not required.

Whether a mobile device is in a vehicle mode may be determined based on a current vehicle characteristic. A current vehicle characteristic may be determined based on information provided by the vehicle or based on information calculated about the vehicle. A current vehicle characteristic may be a characteristic such as a vehicle speed, a vehicle acceleration, a vehicle gear, a vehicle condition evaluation (busy traffic, calm traffic, etc.), or the like. As an example, a vehicles current gear may be provided and a mobile device mode may be determined based on the gear. More specifically, if the vehicle is in either park or neutral, then the mobile device may be operated in a regular mode. However, if the vehicle is in either reverse or first, second, third, fourth, or fifth gear, them the mobile device may be operated in a vehicle mode.

It will also be understood that one or more techniques may be applied when determining whether a mobile device is operating in a vehicle mode. For example, both a vehicle speed and a Bluetooth connection to a vehicle may be required to determine that a mobile device is operating in a vehicle mode.

Figure 2:
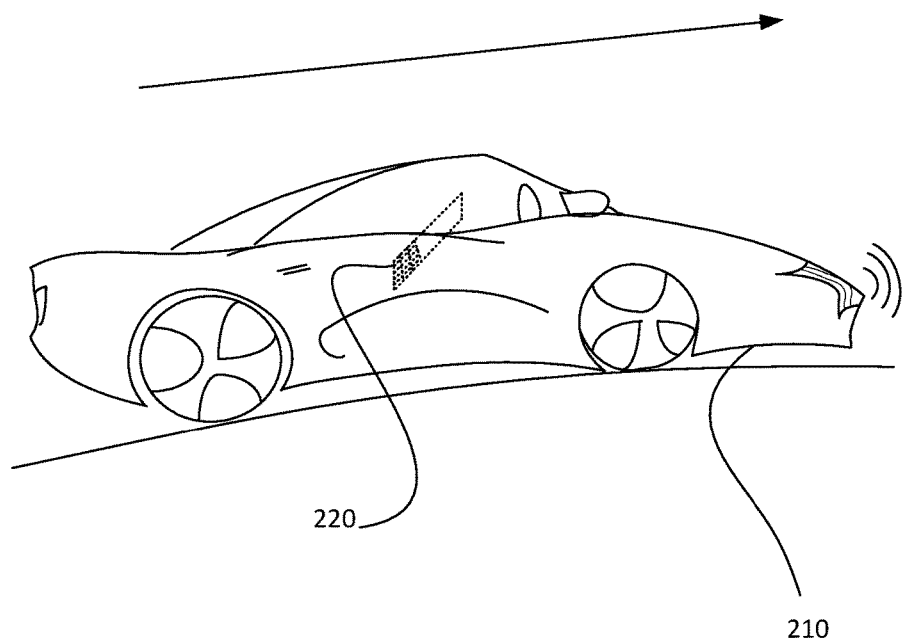
FIG. 2 shows a mobile device in a vehicle according to an implementation of the disclosed subject matter.

As an illustrative example, as shown in FIG. 2, a user device 220 may be located in a vehicle 210. A determination may be made that the vehicle 210 (or the user device 220) is traveling at a speed greater than 5 miles per hour. Based on this determination, the mobile device 220 may be determined to be in vehicle mode. As another example, the user device 220 may be connected to a Bluetooth component of the vehicle 210. Based on the connection, it may be determined that the mobile device 220 is in vehicle mode.

According to an implementation of the disclosed subject matter, as shown in FIG. 1 at steps 120 and step 150, a device notification may be received at the mobile device. The device notification may be based on information related to the mobile device (e.g., remaining battery power) or may be related to information provided to the mobile device (e.g., a notice from a user's bank). Information related to the mobile device may be generated from a processor within the mobile device itself or may be provided with a local or remote server such as a wireless service provider, a manufacturer server, or the like. Information provided to the mobile device may be generated from a third party entity such as a processor, server, database, or the like and may be provided to the mobile device via a connection such as a cellular connection, a data connection, or the like. Some examples of device notifications include notifications associated with device attributes, battery life, incoming communications, messages (e.g., email, SMS messages, application messages, peer to peer messages, etc.), application generated, security, location, or the like. An example notification may be an SMS from a sender that is on a user's favorites list.

According to an implementation of the disclosed subject matter, as shown in FIG. 1 at step 130, a determination may be made that a device notification is an important notification. As disclosed herein, an important notification may be a notification that is considered significant enough for a user to receive while a user is driving. Some examples of important device notifications may include incoming phone calls, incoming messages, banking alerts, certain security alerts, or the like. It will be understood that the example list provided here is not exhaustive and one or more criteria may be applied to designate a device notification as an important notification.

A device notification may be determined to be important based on one or more criteria such as a user selection, a value associated with a notification, a developer based selection, a manufacturer selection, a third party selection, a crowd sourced selection, or the like.

A user selection may correspond to a user selecting a notification type or group as an important notification. The user may select the type of notification (e.g., SMS messages) as being important notifications via an interface provided to the user via a mobile device, a vehicle, or a display such as her laptop, tablet, or other computing device. As an example, when setting up her vehicle mode settings using her mobile phone, a user may select one or more types of notifications to be automatically designated as important notifications. These settings may be adjustable by the user at a later time.

A value associated with a notification may be a numerical value, a hash value, a Boolean value, or the like. The value may be applied to a notification/notification type by a user, developer, manufacturer, wireless provider, crowd sourced decision, or the like. As an example, a developer may apply a Boolean value of 0 or 1 (e.g., 0 corresponding to unimportant and 1 corresponding to important) to an application notification when programming the application. The value may be applied to a predefined field designated for such values (such as the "title" field designated for the title of the application). The mobile device or vehicle may have access to this value and determine whether a notification is important based on the value. As an example, an identity theft relate banking notification may have a Boolean value of 1 indicating that it is an important notification. Accordingly, when a mobile phone receives an identity theft related notification, it may access the Boolean value of 1, and determine that the notification is important.

A crowd sourced selection may correspond to multiple users designating a notification or type of notification as important or unimportant. The crowd sourced designation may be applied towards notifications for a user's device in vehicle mode. As an example of a crowd sourced selection, a majority of users using the vehicle mode arrangement may designate incoming phone calls as important notifications. A user may select an options to "use popular settings" when setting up a vehicle mode on her mobile device. Accordingly, based on the user's selection of the option and a majority of users designating incoming phone calls as important, any incoming phone call based notifications may be designated as important.

A user may select a third party's configuration to apply to her notifications when in vehicle mode. A third party may be a corporation, group of people, a user subset (e.g., friends list, trusted users, a specific user, etc.), or the like. Accordingly, notifications or types of notifications designated as important by the third party may also be designated as important for the user/user device.

According to an implementation of the disclosed subject matter, as shown in FIG. 1 at step 140, a notification that is determined to be important may be provided to a user via an output mode, while the user's device is in vehicle mode. The output mode may be a vehicle display such as a heads up display, a dashboard display, a navigation screen display, a vehicle speaker or the like. As an example, an important notification may, such as an incoming phone call, may be displayed on a user's heads up display if the user's mobile device is in vehicle mode. The output mode may be the display on a user's mobile device. As an example, the screen of a user's mobile device may display the important notification if the user's mobile device is in vehicle mode. Essentially, while in vehicle mode, a user may only receive a notification if the notification is designated as important. This may decrease the number of notifications that a user receives while the user's mobile device is in vehicle mode. A notification may be provided to a user for a predetermined amount of time (e.g., 4 seconds), or may be determined based on the notification. For example, if the notification has a higher importance value, then the amount of time it is provided to a user may be higher.

Figure 3:
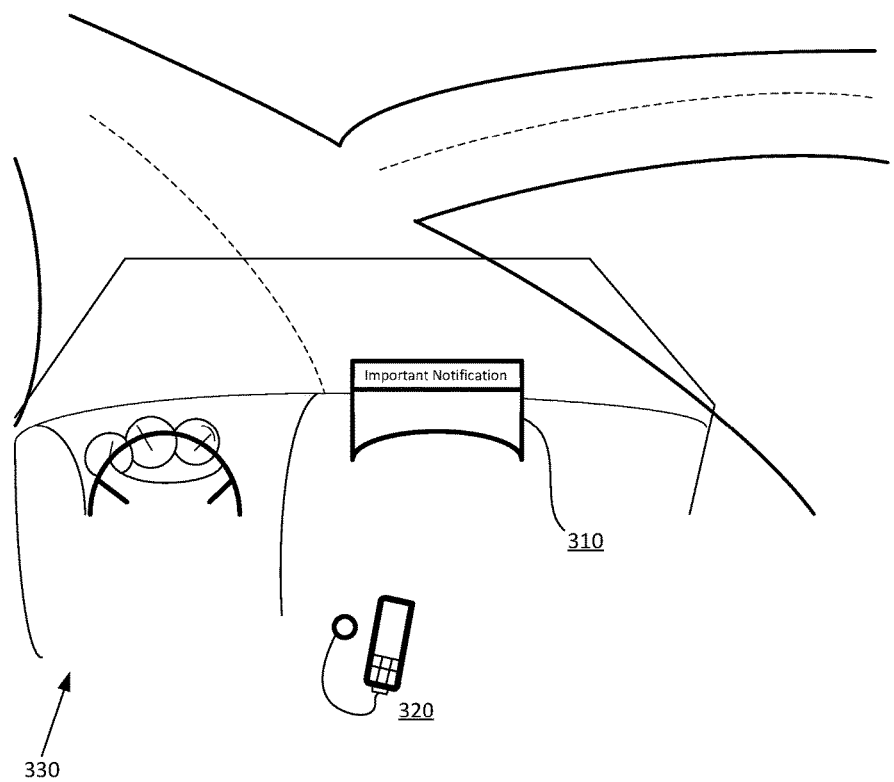
FIG. 3 shows a vehicle display, according to an implementation of the disclosed subject matter.

As an illustrative example, as shown in FIG. 3, a mobile device 320 may be connected to a vehicle 330 via a wired connection. The mobile device 320 may revive an SMS notification. The SMS notification may be determined to be important based on a Boolean value of 1 associated with SMS notifications. Accordingly, the notification may be displayed on the vehicle 330's navigation screen 310. Alternatively, the notification may be auditory provided to the user via a speaker in the user's car (e.g., a tone or a natural language expression).

According to an implementation of the disclosed subject matter, as shown in FIG. 1 at step 160, a determination may be made that a device notification is an unimportant notification. As disclosed herein, an unimportant notification may be a notification that is considered insignificant such that a user need not receive the notification while a user is driving. Some examples of unimportant device notifications may include system updates, application updates, gaming notifications, incoming phone calls or messages from non-favorite contacts, or the like. It will be understood that the example list provided here is not exhaustive and one or more criteria may be applied to designate a device notification as an unimportant notification.

A device notification may be determined to be unimportant based on one or more criteria such as a user selection, a value associated with a notification, a developer based selection, a manufacturer selection, a third party selection, a crowd sourced selection, or the like, as disclosed herein. As an example, a developer may apply a Boolean value of 0 or 1 (e.g., 0 corresponding to unimportant and 1 corresponding to important) to an application notification when programming the application. The value may be applied to a predefined field designated for such values (such as the "title" field designated for the title of the application). If the value is 0, then the notification may be designated as an unimportant notification.

According to an implementation of the disclosed subject matter, an unimportant notification may not be provided to a user via a display or may be provided to only select displays. As an example, an unimportant notification may not be provided to a user at all while a user device is in vehicle mode. As another example, an unimportant notification may only be provided to a user's mobile device display and not to the user's vehicle display while the mobile device is in a vehicle mode.

According to an implementation of the disclosed subject matter, one or more unimportant notifications, received while a mobile device is in vehicle mode, may be provided to a user via a mobile device display or a vehicle display when the mobile device is no longer in the vehicle mode. As an example, a mobile device may be determined to be in a vehicle mode when moving at a speed of over 5 miles per hour. During this time, the mobile device may receive 2 unimportant notifications. As disclosed herein, these notifications may not be displayed to the user while the mobile device is in vehicle mode. If the user come to a stop or decreases her speed below 5 miles per hour, the notifications may be provided via either one or more vehicle displays, the mobile device display, or both.

According to an implementation of the disclosed subject matter, a mobile device display (e.g., the screen of a mobile phone or tablet) may not receive notifications such that only one or more vehicle displays receive the notification. The mobile device display may be enabled and may continue operation without receiving any notifications. As an example, a mobile device in vehicle mode may provide notifications and navigation information to a vehicle display. At the same time, the mobile device display may be operated to play a video game by a user different than the one that is driving. Here, the mobile device may provide important notifications via a vehicle display, while being used by a non-driving user.

Figure 4:
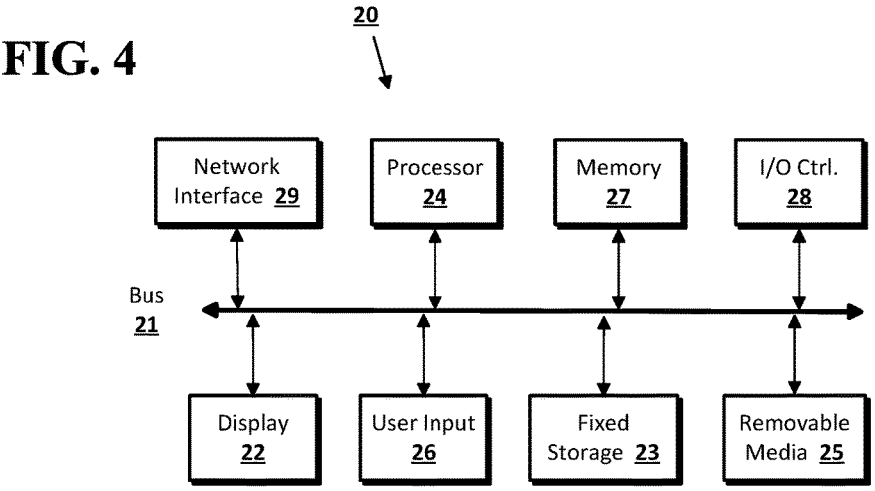
FIG. 4 shows a computer according to an implementation of the disclosed subject matter.

Implementations of the presently disclosed subject matter may be implemented in and used with a variety of component and network architectures. As an example, a mobile phone may be in connection with a cloud server and the cloud server may provide information to an event listener. FIG. 4 is an example computer 20 suitable for implementing implementations of the presently disclosed subject matter. The computer (e.g., mobile phone, tablet, laptop, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
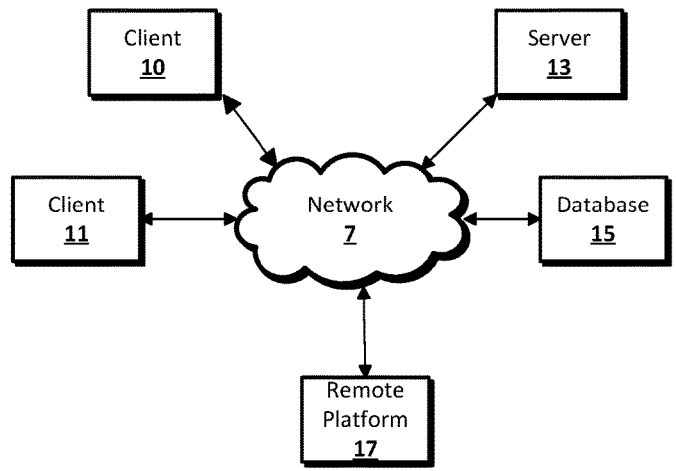
FIG. 5 shows a network configuration according to an implementation of the disclosed subject matter.

FIG. 5 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, at a mobile device, a current gear setting from a vehicle,
setting the mobile device in a vehicle mode based on the current gear setting received from the vehicle;
receiving a first notification at the mobile device;
determining that the first notification is an important notification based on a first importance value that indicates that the first notification is important;
providing the first notification via an output mode based on the first notification being an important notification and the mobile device being in the vehicle mode;
receiving a second notification at the mobile device;
determining that the second notification is an unimportant notification based on a second importance value that indicates that the second notification is unimportant; and
suppressing the second notification via the output mode based on the second notification being an unimportant notification and the mobile device being in the vehicle mode,
wherein the first notification is provided for an amount of time determined based on the first importance value of the first notification.

2. The method of claim 1, wherein setting the mobile device in a vehicle mode based on the current gear setting comprises setting the mobile device in a regular mode when the current gear setting is park or neutral and setting the mobile device in a vehicle mode when the current gear setting is not park or neutral.

3. The method of claim 1, wherein the first notification and the second notification are determined to be important or unimportant based on a crowd sourced selection of which types of notifications are important.

4. The method of claim 1, wherein at least one of the first notification and the second notification is an application notification determined to be important or unimportant based on a value assigned by a developer of the application to a predefined field of the application notification.

5. The method of claim 1, further comprising providing the second notification via the output mode when the mobile device is no longer in vehicle mode.

6. The method of claim 1, wherein determining that the first notification is an important notification comprises detecting an importance value associated with the first notification.

7. The method of claim 1, wherein determining that the first notification is an important notification comprises determining a user setting for a notification type associated with the first notification.

8. The method of claim 1, wherein determining that the second notification is an unimportant notification comprises detecting an importance value associated with the second notification.

9. The method of claim 1, wherein determining that the second notification is an unimportant notification comprises determining a user setting for a notification type associated with the second notification.

10. The method of claim 1, wherein the output mode is one or more selected from the group consisting of: a vehicle display and a vehicle speaker.

11. The method of claim 10, further comprising not providing the first notification on the mobile device display while providing the first notification via the output mode.

12. The method of claim 10, further comprising enabling operation of the mobile device display while the mobile device is in a vehicle mode, wherein the mobile device display does not receive the first or the second notification.

13. A system comprising:
    a processor, the processor configured to:
        receive a current gear setting from a vehicle;
        set a mobile device in a vehicle mode based on the current gear setting received from the vehicle;
        receive a first notification at the mobile device;
        determine that the first notification is an important notification based on a first importance value that indicates that the first notification is important;
        provide the first notification via an output mode based on the first notification being an important notification and the mobile device being in the vehicle mode;
        receive a second notification at the mobile device;
        determine that the second notification is an unimportant notification based on a second importance value that indicates that the second notification is unimportant; and
        suppress the second notification via the output mode based on the second notification being an unimportant notification and the mobile device being in the vehicle mode,
        wherein the first notification is provided for an amount of time determined based on the first importance value of the first notification.

14. The system of claim 13, wherein setting the mobile device in a vehicle mode based on the current gear setting comprises setting the mobile device in a regular mode when the current gear setting is park or neutral and setting the mobile device in a vehicle mode when the current gear setting is not park or neutral.

15. The system of claim 13, wherein the processor is further configured to provide the second notification via the output mode when the mobile device is no longer in vehicle mode.

16. The system of claim 13, wherein determining that the first notification is an important notification comprises detecting an importance value associated with the first notification.

17. The system of claim 13, wherein determining that the first notification is an important notification comprises determining a user setting for a notification type associated with the first notification.

18. The system of claim 13, wherein the output mode is one or more selected from the group consisting of: a vehicle display and a vehicle speaker.

19. The system of claim 18, wherein the processor is further configured to not provide the first notification on the mobile device display while providing the first notification via the output mode.

20. A method comprising:
    receiving, at a mobile device, an indication of a connection to a vehicle;
    receiving, at the mobile device, an indication of a speed of the vehicle via the connection;
    setting the mobile device in a vehicle mode based on the connection and the speed of the vehicle;
    receiving a first notification at the mobile device;
    determining that the first notification is an important notification based on a first importance value that indicates that the first notification is important;
    providing the first notification via an output mode based on the first notification being an important notification and the mobile device being in the vehicle mode;
    receiving a second notification at the mobile device;
    determining that the second notification is an unimportant notification based on a second importance value that indicates that the second notification is unimportant; and
    suppressing the second notification via the output mode based on the second notification being an unimportant notification and the mobile device being in the vehicle mode,
    wherein the first notification is provided for an amount of time determined based on the first importance value of the first notification.

21. The method of claim 20, wherein at least one of the first notification and the second notification originates from an application installed on the mobile device.

22. The method of claim 20, wherein the output mode is a mobile device display.

23. The method of claim 20, further comprising providing the notification for an amount of time selected from the group consisting of: a default amount of time and a preset amount of time based upon a notification type associated with the first notification.

24. The method of claim 20, wherein the first notification and the second notification are determined to be important or unimportant based on a third party designation of which types of notifications are important.

25. A system comprising:
    a processor, the processor configured to:
        receive an indication of a connection to a vehicle;
        receive an indication of a speed of the vehicle via the connection;
        set the mobile device in a vehicle mode based on the connection and the speed of the vehicle;
        receive a first notification at the mobile device;
        determine that the first notification is an important notification based on a first importance value that indicates that the first notification is important;

provide the first notification via an output mode based on the first notification being an important notification and that the mobile device being in the vehicle mode;

receive a second notification at the mobile device;

determine that the second notification is an unimportant notification based on a second importance value that indicates that the second notification is unimportant; and suppress the second notification via the output mode based on the second notification being an unimportant notification and the mobile device being in the vehicle mode, wherein the first notification is provided for an amount of time determined based on the first importance value of the first notification.

26. The system of claim 20, wherein at least one of the first notification and the second notification originates from an application installed on the mobile device.

27. The system of claim 20, wherein the output mode is a mobile device display.

28. The system of claim 20, wherein the processor is further configured to provide the notification for an amount of time selected from the group consisting of: a default amount of time and a preset amount of time based upon a notification type associated with the first notification.

29. The system of claim 20, wherein the processor is configured to determine the first notification and the second notification to be important or unimportant based on a third party designation of which types of notifications are important.

* * * * *